(12) United States Patent
Nelson et al.

(10) Patent No.: US 7,558,221 B2
(45) Date of Patent: Jul. 7, 2009

(54) METHOD AND SYSTEM FOR RECORDING VIDEOCONFERENCE DATA

(75) Inventors: Steve Nelson, San Jose, CA (US); Chia-Hsin Li, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 1049 days.

(21) Appl. No.: 10/778,370

(22) Filed: Feb. 13, 2004

(65) Prior Publication Data

US 2005/0180341 A1 Aug. 18, 2005

(51) Int. Cl.
*H04L 12/28* (2006.01)
*H04Q 11/00* (2006.01)
*H04L 12/66* (2006.01)
*H04N 7/14* (2006.01)

(52) U.S. Cl. .................. 370/260; 370/352; 348/14.08

(58) Field of Classification Search ......... 370/351–356, 370/260–261; 348/14.01–14.08; 709/223
See application file for complete search history.

(56) References Cited

U.S. PATENT DOCUMENTS

| | | | | |
|---|---|---|---|---|
| 5,668,863 | A * | 9/1997 | Bieselin et al. | 379/202.01 |
| 5,689,641 | A | 11/1997 | Ludwig et al. | |
| 5,710,591 | A * | 1/1998 | Bruno et al. | 348/14.09 |
| 5,821,984 | A * | 10/1998 | Ito et al. | 348/14.09 |
| 5,915,091 | A | 6/1999 | Ludwig et al. | |
| 6,044,401 | A | 3/2000 | Harvey | |
| 6,122,665 | A * | 9/2000 | Bar et al. | 709/224 |
| 6,298,129 | B1 | 10/2001 | Culver et al. | |
| 6,466,248 | B1 | 10/2002 | Spann et al. | |
| 6,606,306 | B1 * | 8/2003 | Lin et al. | 370/261 |
| 6,674,459 | B2 * | 1/2004 | Ben-Shachar et al. | 348/14.09 |
| 7,225,227 | B2 | 5/2007 | Omura et al. | |
| 2004/0031054 | A1 | 2/2004 | Dankworth et al. | |
| 2004/0114541 | A1 * | 6/2004 | Caspi et al. | 370/260 |
| 2004/0114746 | A1 * | 6/2004 | Caspi et al. | 379/202.01 |
| 2005/0198252 | A1 * | 9/2005 | Nisani et al. | 709/223 |
| 2007/0198638 | A1 | 8/2007 | Omura et al. | |

FOREIGN PATENT DOCUMENTS

GB    2 319 137    5/1998

(Continued)

OTHER PUBLICATIONS

Nisani et al., Computer Management System for Computer Network Based Telephones, Sep. 2000, pp. 1-40.*

(Continued)

*Primary Examiner*—Ahmad F Matar
*Assistant Examiner*—Sonia Gay

(57) ABSTRACT

A recording system for capturing videoconference session data is provided. The recording system includes a packet intercepting unit configured to identify packets related to the videoconference data being transmitted over a network. The packet intercepting unit is further configured to sort the related packets into corresponding files, wherein each data stream of the videoconference session is associated with one of the corresponding files. A decoder configured to decode data in each of the corresponding files to respective data streams is included, as well as a mixer/composer configured to combine the respective data streams into a single data stream. A recording device configured to record the single data stream onto a storage medium is included. A videoconference system and methods for efficiently recording videoconference data are included.

32 Claims, 8 Drawing Sheets

FOREIGN PATENT DOCUMENTS

| | | |
|---|---|---|
| GB | 2 319 137 A | 5/1998 |
| GB | 2 352 845 | 2/2001 |
| GB | 2 352 845 A | 2/2001 |
| JP | 10-164057 | 6/1998 |
| JP | 10-285531 | 10/1998 |
| JP | 11-069331 | 3/1999 |
| JP | 2002-325239 | 11/2002 |
| JP | 2002-335478 | 11/2002 |
| JP | 2003-335478 | 11/2002 |
| JP | 2003-111042 | 4/2003 |
| JP | 2003-134487 | 5/2003 |
| JP | 2003-324704 | 11/2003 |

OTHER PUBLICATIONS

*IEEE Xplore* "Packet Sniffing: a brief introduction", Ansari, S., Rajeev, S.G., Chandrashekar, H.S., (pp. 17-19), (Dec. 2002).

*Portal Archiving Telemeetings*, Constantin Arapis, (pp. 545-552), (1999).

\* cited by examiner

METHOD AND SYSTEM FOR RECORDING VIDEOCONFERENCE DATA

CROSS REFERENCE TO RELATED APPLICATIONS

This application is related to U.S. patent application Ser. No. 10/192,080, filed on Jul. 10, 2002, and entitled "Multi-Participant Conference System with Controllable Content Delivery Using a Client Monitor Back-Channel." This application is hereby incorporated by reference in its entirety for all purposes.

BACKGROUND OF THE INVENTION

The present invention relates generally to video conferencing systems, and more particularly to a method in system for recording audio/video streams of a video conference without requiring extra bandwidth or CPU processing power.

As videoconferencing becomes more prevalent, additional features are being provided in order for the videoconferencing applications to further appeal to a broader range of participants. One feature that is being pursued is the ability to record the videoconference session. Currently, the server hosting the videoconference session processes incoming audio/video streams, generates composite frames for each participant, encodes the generated frames and transmits those frames to each participant.

Recording videoconference sessions may require extra bandwidth and central processing unit (CPU) processing power. Videoconference meetings hosted by a meeting conference unit (MCU) server requires a significant amount of CPU processing power in order to process the incoming audio/video stream, generate composite frames for each participant, encode the generated frames, and transmit those frames to a participant. Thus, any additional processing required for the recording of the videoconference session will add extra overhead to the MCU server. Consequently, participants may start to get a choppy audio, noisy video, and a lower frame rate when viewing the videoconference. In essence, the actual videoconference session quality perceived by each participant may drop in order to provide the ability to record the videoconference session.

In view of the foregoing, what is needed is a method and system for recording a videoconference session without adding extra overhead to the host server, and the recorded videoconference session is easily accessible for review.

SUMMARY OF THE INVENTION

Broadly speaking, the present invention fills these needs by providing a method and system for intelligently recording a videoconference session without adding to the overhead of the host server. The present invention can be implemented in numerous ways, including as a process, an apparatus, a system, a device, a method, or a computer readable media. Several embodiments of the present invention are described below.

In one embodiment, a method for recording videoconference data without impacting performance of a host videoconference server is provided. The method includes the operations of: a) intercepting a packet associated with the host videoconference server; b) analyzing the packet; and c) determining if the packet is related to a videoconference session associated with the host videoconference server. If the packet is related to the video conference session, then the method includes, d) determining a videoconference stream corresponding to the packet; e) storing the packet in a file associated with the videoconference stream; and f) repeating a)-e) for additional packets of the videoconference session. Upon completion of the videoconference session, a single videoconference stream is generated from packets in each file associated with the videoconference stream. Then, the single videoconference stream ,may be stored onto a storage medium, wherein the recorded video conference stream includes an index related to a timestamp of the packet.

In another embodiment, a method for efficiently recording videoconference data of a videoconference session is provided. The method initiates with identifying videoconference data transmitted over a distributed network. Then, packets associated with the videoconference data are sorted according to a contributing source identification. Next, a videoconference audio signal and a videoconference video signal are generated from the sorted packets. Then, the videoconference audio signal and the videoconference video signal are mixed based upon a time stamp, or a series of time stamps, associated with each of the sorted packets. Next, an event recorded during the videoconference session is associated with the mixed signal according to common time stamps of the mixed signal and the event. Then a layout of a display associated with the mixed signal is composed based on the event. It should be appreciated that a time index for the audio/video stream may generated here.

In a further embodiment, a computer readable medium having program instructions for recording videoconference data of a videoconference session is provided. The computer readable medium includes program instructions for identifying videoconference data transmitted over a distributed network and program instructions for sorting packets associated with the videoconference data according to a contributing source identification. Program instructions for generating a videoconference audio signal from the sorted packets and program instructions for generating a videoconference video signal from the sorted packets are included. Program instructions for mixing the videoconference audio signal and the videoconference video signal based upon a time stamp associated with each of the sorted packets are provided. Program instructions for associating an event recorded during the videoconference session with the mixed signal according to common time stamps of the mixed signal and the event and program instructions for composing a layout of a display associated with the mixed signal based on the event are included. Program instructions for generating a time index are included.

In yet another embodiment, a video conference system is provided. The video conference system includes a plurality of clients and a host server configured to distribute media to the plurality of clients over a distributed network. The host server is further configured to receive media from the plurality of clients. The system includes a packet intercepting unit having access to the distributed network. The packet intercepting unit is configured to identify packets related to a video conference session hosted by the host server. The packet intercepting unit is further configured to sort the identified packets according to a contributing source. A media management system in communication with the host system is included. In one aspect of the invention, the media management system includes a media management server configured to manage both media data and annotation data for distribution to participants of the videoconference session and a storage server in communication with the media management server. The storage server is configured to store the media data and the annotation data. The media management system may also include an event database in communication with the media management server. The event database is configured to capture events associated with the annotation data. In another aspect of the invention, the media management system includes a media analysis server that is in communication with the media management server, the event database, and the storage server. The media analysis server is configured to associate the stored annotation data with the captured events.

In still yet another embodiment, a recording system for capturing videoconference session data is provided. The recording system includes a packet intercepting unit configured to identify packets related to the videoconference data being transmitted over a network. The packet intercepting unit is further configured to sort the related packets into corresponding files, wherein each data stream of the videoconference session is associated with one of the corresponding files. A decoder configured to decode data in each of the corresponding files to respective data streams is included, as well as a mixer/composer configured to combine the respective data streams into a single data stream. A recording device configured to record the single data stream onto a storage medium is included.

Other advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for a videoconference system capable of recording a videoconference session without incurring added overhead for the host videoconference server is provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

The embodiments described herein provide for a recording system that intelligently processes audio/video streams of a videoconference in a manner that does not add overhead to a host videoconference server. The recording system utilizes a sniffer configured to identify packets associated with a videoconference based upon packet header data. The sniffer (also referred to as a packet intercepting unit) filters the videoconference packets being distributed over a network from non-videoconference packets. In one embodiment, the sniffer is a network adapter set to promiscuous mode to intercept and identify packets. It should be appreciated that while the packets are intercepted by the sniffer, the packets are not destroyed/consumed. Thus, packet transmission on the network is unaffected by the sniffer. In another embodiment, the sniffer filters the packets according to a packet type and a port number associated with the packet. For example, the packet type for the videoconference packets may be associated with a real time protocol (RTP). Then, the sniffer sorts the filtered packets according to a contributing source (CSRC) which is used to identify the videoconference stream. The sorted packets are decoded and a mixer/composer then takes the decoded sorted data and combines the data to provide a composite audio/video stream. This composite stream is recorded onto a computer readable media, e.g., a video compact disc (VCD) or a digital versatile disc (DVD). In one embodiment, an index for the computer readable media is created through matching time stamps associated with events generated during the videoconference session and time stamps of the composite stream. It should be appreciated that the recording is accomplished off-line from the videoconference host server. Thus, there is no impact on the overhead or CPU processing power.

Figure 1:
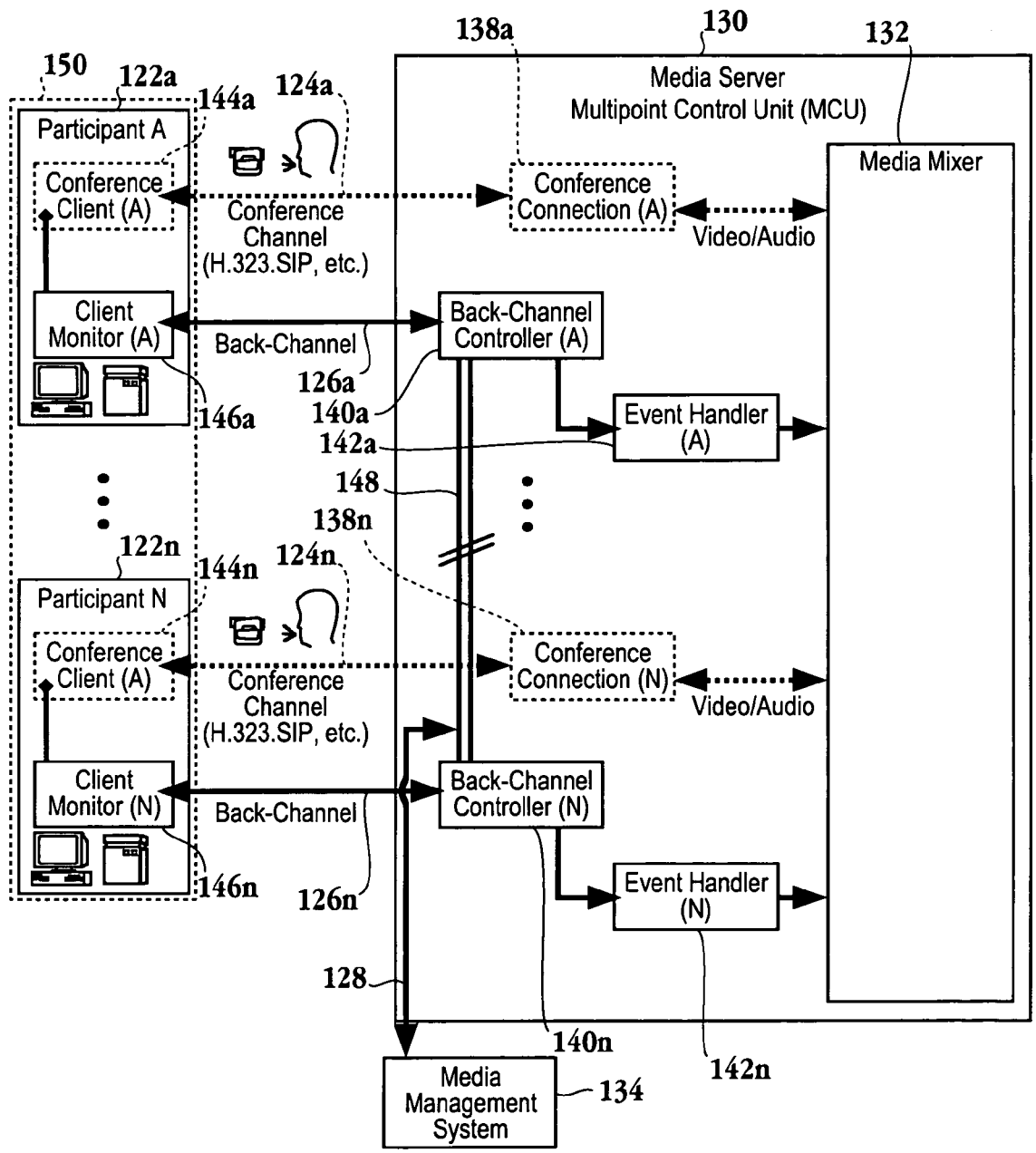
FIG. 1 is a schematic diagram illustrating the components for a multi-participant conference system using a client monitor back-channel in accordance with one embodiment of the invention.

FIG. 1 is a schematic diagram illustrating the components for a multi-participant conference system using a client monitor back-channel in accordance with one embodiment of the invention. The client component includes multiple participants, such as participant A 122a through participant N 122n. In this embodiment, each participant 122a-122n includes conference client 144 and client monitor 146. Conference client A 144a may include the participant's peer-to-peer videoconferencing software or any proprietary videoconferencing software application. It should be appreciated that each participant may place calls to another participant, establish and disconnect a conferencing session, capture and send content, receive and playback the content exchanged, etc. Calls from each of the conference clients route through media transport server 130. That is, the participants use their associated conference client to place calls to media transport server 130 to join the conference. In one embodiment, conference client A 144a includes a high-level user-interface for the conference, such as when the conference client is a pre-existing software application. For example, one such product that provides peer-to-peer videoconferencing is the NETMEETING application software from MICROSOFT Corporation.

CM 146a is configured to monitor conference client A 144a That is, CM 146a looks at how a user is interacting with the software application by monitoring a video display window of client A 144*a*, in one embodiment. In addition, CM 146*a* interprets the users interactions in order to transmit the interactions to the server component. In one embodiment, CM 146 is configured to provide four functions. One function monitors the start/stop of a conference channel so that a back-channel communication session can be established in parallel to a conference channel session between the participant and the server component. A second function monitors events, such as user interactions and mouse messages, within the video window displayed by conference client 144. A third function handles control message information between CM 146 and a back-channel controller 140 of the server component. A fourth function provides an external user-interface for the participant that can be used to display and send images to other conference members, show the other connected participants' names, and other suitable communication information or tools.

As mentioned above, the client monitor watches for activity in the associated conference client. In one embodiment, this includes monitoring user events over the video display region containing the conference content, and also includes the conference session control information. For example, CM 146 watches for the start and end of a conference session or a call from the conference client. When conference client 144 places a call to media transport server 130 to start a new conference session, CM 146 also places a call to the media transport server. The call from CM 146 establishes back-channel connection 126 for the participant's conference session. Since CM 146 can monitor the session start/stop events, back-channel connection 126 initiates automatically without additional user setup, i.e., the back-channel connection is transparent to a user. Accordingly, a new session is maintained in parallel with conference client 144 activity. It should be appreciated that conference channels 124*a*-124*n* provide a video/audio connection between the associated conference client 144 and conference connection 138 of media transport server 130. In one embodiment, conference channel 124 provides a communication link for real-time video/audio data of the conference session communicated between the client component and the server component.

CM 146 may specifically monitor activity that occurs over the conference's video frame displayed by conference client 144. For example, CM 146 may monitor the video image in MICROSOFT'S NETMEETING application. Mouse activity in the client frame is relayed via protocol across back-channel connection 126 to media transport server 130. In turn, back-channel controller 140 can report this activity to another participant, or event handler 142 for the respective participant. In this embodiment, the monitoring of conference client 144 application occurs through a hook between the operating system level and the application level. As mentioned above, the video window can be watched for mouse clicks or keyboard strokes from outside of the videoconferencing application. Alternatively, proprietary videoconferencing application software may be provided which integrates the client monitor functionality to provided relevant information to a back-channel network.

In another embodiment, CM 146 can present a separate user-interface to the participant. This interface can be shown in parallel to the user interface presented by conference client 144 and may remain throughout the established conference. Alternatively, the user interface presented by CM 146 may appear before or after a conference session for other configuration or setup purposes.

In yet another embodiment, CM 146 may provide an interface for direct connection to a communication session hosted by media transport server 130 without need for a conference client. In this embodiment, CM 146 presents a user interface that allows back-channel connection 126 to be utilized to return meeting summary content, current meeting status, participant information, shared data content, or even live conference audio. This might occur, for instance, if the participant has chosen not to use conference client 144 because the participant only wishes to monitor the activities of the communication. It should be appreciated that the client component can be referred to as a thin client in that conference client 144 performs minimal data processing. In short, any suitable videoconference application may be included as conference client 144.

As previously mentioned, CM 146*a* is configured to recognize when the videoconference application of conference client A 144*a* starts and stops running, in turn, the CM can start and stop running as the conference client does. CM 146*a* can also receive information from the server component in parallel to the videoconference session. For example, CM 146*a* may allow participant A 122*a* to share an image during the conference session. Accordingly, the shared image may be provided to each of the client monitors so that each participant is enabled to view the image over a document viewer rather than through the video display region of the videoconference software. As a result, the participants can view a much clearer image of the shared document. In one embodiment, a document shared in a conference is available for viewing by each of the clients.

The server component includes media transport server 130, which provides a multi-point control unit (MCU) that is configured to deliver participant customizable information. It should be appreciated that media transport server 130 and the components of the media transport server may include software code configured to execute functionality as described herein. In one embodiment, media transport server 130 is a component of a hardware based server implementing the embodiments described herein. Media transport server 130 includes media mixer 132, back-channel controller 140, and event handler 142. Media transport server 130 also provides conference connection 138. More specifically, conference connection A 138*a* completes the link allowing the videoconferencing software, e.g., a peer-to-peer videoconferencing application, of conference client A 144*a* to communicate with media transport server 130. That is, conferencing endpoint 138*a* emulates another peer and performs a handshake with conference client A 144*a*, which is expecting a peer-to-peer connection.

In one embodiment, media transport server 130 provides Multipoint Control Unit (MCU) functionality by allowing connections of separate participants into selectable logical rooms for shared conference communications. As an MCU, media transport server 130 acts as a "peer" to a conference client, but can also receive calls from multiple participants. One skilled in the art will appreciate that media transport server 130 internally links all the participants of the same logical room, defining a multi-participant conference session for each room, with each peer-to-peer conference client operating with the media hub only as a peer. As mentioned above, media transport server 130 is configured to conform to the peer requirements of the associated conference client. For example, if the conference clients are using H.323 compliant conference protocols, as found in applications like MICROSOFT'S NETMEETING, media transport server 130 must also support the H.323 protocol. In other words, the conference communication can occur via H.323 protocols, Session Initiated Protocols (SIP), or other suitable APIs that match the participant connection requirements.

Still referring to FIG. 1, media mixer 132 is configured to assemble audio and video information specific to each participant from the combination of all participants' audio and video information, the specific participant configuration information, and server user-interface settings. Media mixer 132 performs multiplexing work by combining incoming data streams, i.e., audio/video streams, on a per participant basis. In one embodiment, media mixer 132 includes a video layout processor and an audio distribution processor which assemble the conference signals. A client monitor-back-channel network allows media transport server 130 to monitor a user's interactions with conference client 144 and to provide the appearance that the peer-to-peer software application has additional functionality. The additional functionality adapts the peer-to-peer functionality of the software application, executed by conference client 144, for the multi-participant environment described herein. The client monitor-back-channel network includes client monitor 146, back-channel connection 126, back-channel controller 140, and event handler 142.

Back-channel connections 126a-126n are analogous to a parallel conference in addition to conference channels 124a-124n, respectively. Back-channel controllers (BCCs) 140a-140n maintain the communication link from each associated client monitor. Protocols defined on the link are interpreted at media transport server 130 and passed to the appropriate destinations, i.e., other participant's back-channel controllers, event handler 142, or back to the CM 146. Each of the back-channel controllers 140a-140n are in communication through back-channel controller communication link 148. Media management system 134, which is discussed in more detail below, communicates through the back channel network.

In one embodiment, media transport server 130 provides a client configurable video stream containing a scaled version of each of the conference participants. A participant's event handler 142 in media transport server 130 is responsible for maintaining state information for each participant and passing this information to media mixer 132 for construction of that participants user-interface. In another embodiment, a server-side user-interface may also be embedded into the participant's video/audio streams. Further details on the architecture illustrated by FIG. 1 may be found in U.S. patent application Ser. No. 10/192,080, filed on Jul. 10, 2002, and entitled "Multi-Participant Conference System with Controllable Content Delivery Using a Client Monitor Back-Channel."

It should be appreciated that FIG. 1 represents one particular architecture for media transport server and the client component. It will be apparent to one skilled in the art that media transport server 130 may be based on any suitable architecture that includes the back-channel functionality. In addition, the client component may include any suitable client software configurations that enable a view of the videoconference session. The client software configurations may range from commercially available software packages, i.e., NETMEETING, to proprietary software configurations which may be downloaded to a client through a distributed network, such as the Internet. Thus, FIG. 1 represents one exemplary architecture that may be employed with the embodiments described below and is not meant to be limiting.

Figure 2:
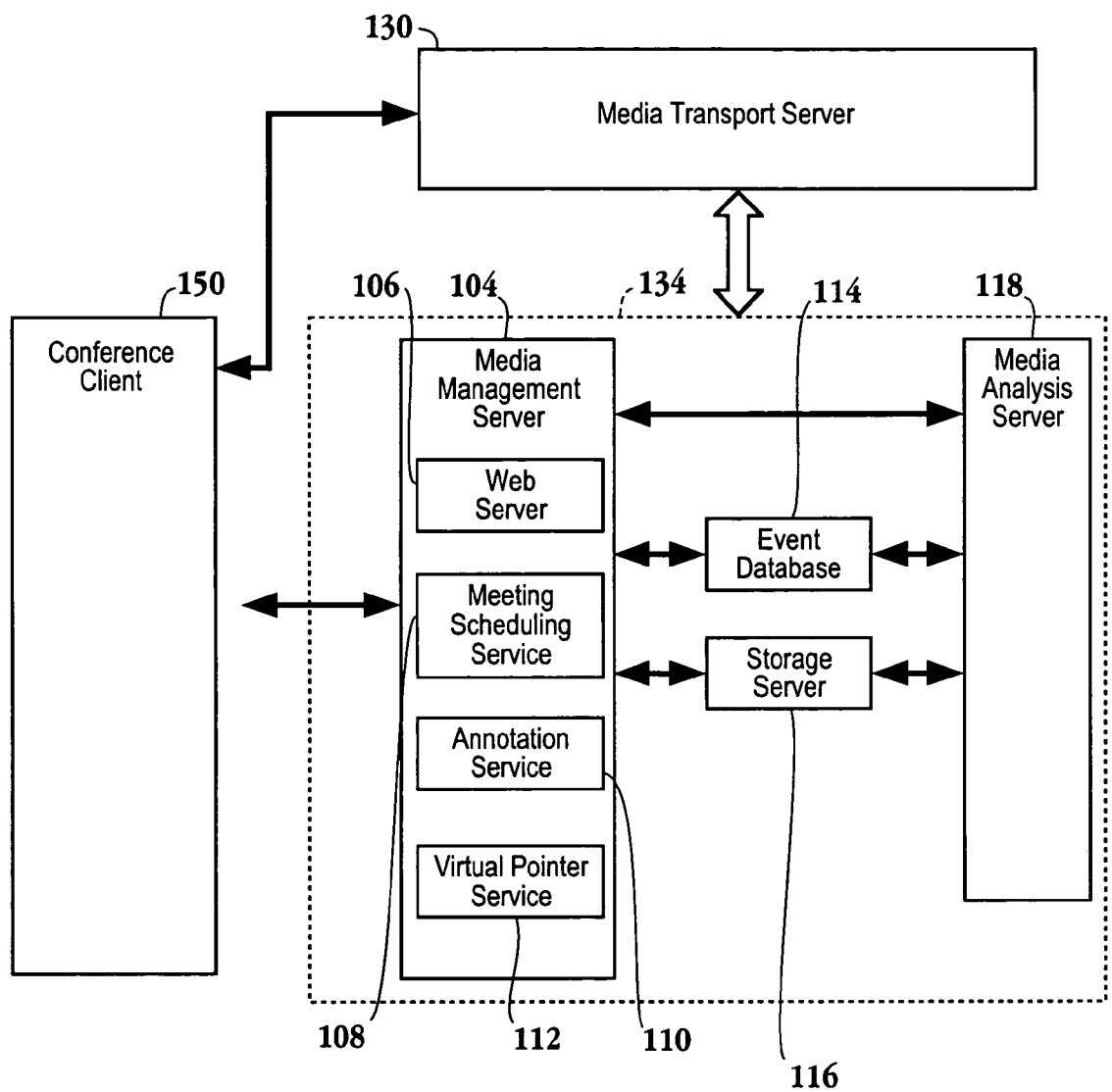
FIG. 2 is a simplified schematic diagram illustrating the relationship between modules of the annotation management system in accordance with one embodiment of the invention.

FIG. 2 is a simplified schematic diagram illustrating the relationship between modules of the annotation management system in accordance with one embodiment of the invention. It should be appreciated that the overall system architecture design of FIG. 2 may be in communication with any suitable video conferencing system, e.g., media transport server 130 of the video conferencing system depicted with reference to FIG. 1. Media management system 134 of FIG. 2 is in communication with conference client 150 through media transport server 130. Conference client 150 may be configured as participants 122a-122n of FIG. 1. In addition, where conference client 150 represents multiple clients, each of the clients may be configured to execute the client application software configurations described with reference to FIG. 1. It should be appreciated that the media management system 134 may be configured to synchronize annotations across all participants that are conversing.

Media management system 134 of FIG. 2 includes media management server 104. Media management server 104 includes web server module 106, meeting scheduling service module 108, annotation service module 110 and virtual pointer service module 112. In one embodiment, annotation service module 110 provides the functionality for a conference client to add annotation data during a videoconference session or view annotation data from a previously recorded videoconference session. Also included in media management system 134 is media analysis server 118, event database 114 and storage server 116. Media management server 104 manages and organizes the meeting, e.g., manages and organizes videoconference data for distribution among the participants of the meeting. Additionally, media management server 104 builds the database to manage the medias and allow the meeting participants to retrieve the media data from storage server 116. Media management server 104 also retrieves the information from media analysis sever 118 and any modules for media playback and presentation. The post-processing of the media data recorded during the meeting, i.e., videoconference session, is performed by media analysis server 118. Media analysis server 118 adds and retrieves information to event database 114 to store the information for the media presentation and playback.

Storage server 116 is responsible for storing the media generated during a videoconference session, which may include annotation data and virtual pointer data. For example, all sketches made during the meeting are captured and may be displayed as part of a meeting summarization. In one embodiment, the meeting summarization allows annotations to be viewed in the context of other events that take place during the meeting. In another embodiment, the annotation data will be stored on storage server 116 in vector format so that it can be scaled for display on devices of any output resolution. It should be appreciated that annotation data and virtual pointer data may be associated with a time stamp corresponding to an origination time in one embodiment.

As described with reference to FIG. 1, media transport server 130 handles the videoconference connections from the participants and combines the many incoming video and audio streams into a single output stream in the desired format for each participant/client. During a videoconference session, media transport server 130 communicates with media management server 104, informing the media management server of such details as when participants connect or disconnect.

Web server module 106 enables the downloading of any software code needed for participating or viewing the videoconference session. Meeting scheduling service module 108 enables a user to set up or join a videoconference session. That is, a user that desires to set up or join a videoconference session may do so through a web browser that may download hyper text markup language (HTML) type pages provided through web server module 106. Once the user has joined the video conference session, software code may be downloaded from web server 106, e.g., software code related to client functionality after which the client begins communicating with media transport server 130. It should be appreciated that through meeting scheduling service module 108, media management server 104 connects to the appropriate media transport server to enable the video conference session. In another embodiment, since the video conference session is stored, upon completion of the video conference session a meeting summary may be created. The meeting summary may be accessed through web server 106. The meeting summary is an overview of the meeting that may be presented to a user so that the user may better decide whether to view the meeting, or what portions of the meeting to view. In one embodiment, the recording system described herein, is configured to provide an index associated with the videoconference session where captured events or annotation data are correlated to the recorded videoconference session. Thus, the recorded videoconference session may include this index, which is analogous to scene selections provided on DVD's of commercially available movies.

Media management server 104 is in communication with media analysis server 118. In one embodiment, media management server 104 retrieves the information from media analysis server 118 and associated modules for media playback and presentation. Media analysis server 118 is also in communication with event data base 114 and storage server 116. As mentioned above, media analysis server 118 performs the post-processing of the media recorded during the meeting and analyzes the media to build information to be used for media presentation and playback. Media analysis server 118 may also add and retrieve annotation information to event database 114. In one embodiment, the annotation information is identified through the insertion of indices and markers into the stored videoconference data, thereby enabling reconstruction of the stored videoconference data based upon the annotation information. It should be noted that a time stamp may be used as an index or marker. As used herein, annotation information may include virtual pointer information. Virtual pointer information may refer to mouse moves transmitted to media management server 104 and then distributed out to participants, so that each participant may view the mouse moving within the associated client display. It should be appreciated that annotation management information may be referred to as virtual ink. In another embodiment, the annotation information includes the data stored in event data base 114 as discussed below.

Storage server 116 of FIG. 2 is configured to store media associated with the videoconference. Storage server 116 is responsible for storing any suitable media utilized for the videoconference session. In one embodiment, storage server 116 contains storage devices, such as hard drives, magnetic tapes, and DVD-Rom, etc. Access to the stored media may be provided through a set of application programming interfaces (APIs) defined for accessing the media that may be retrieved from storage server 116 by other components in the system. In another embodiment, storage server 116 accepts network connections for users or participants of the videoconference to upload their medias. Exemplary mechanisms for uploading the medias to the storage server include: Simple transport control protocol/Internet protocol (TCP/IP) socket connection, hypertext transport protocol (HTTP) file upload protocol, simple object oriented access protocol (SOAP/XML), and other suitable network transport protocols.

Event database 114 of FIG. 2 stores annotation events occurring during the videoconference session. Exemplary annotation events include the following events: the annotation start point, the annotation end point, an annotation clear page, the annotation data, user information associated with the annotation start and the annotation end, the annotation target, e.g., type of media, a target identifier, and other suitable annotation information.

Figure 3:
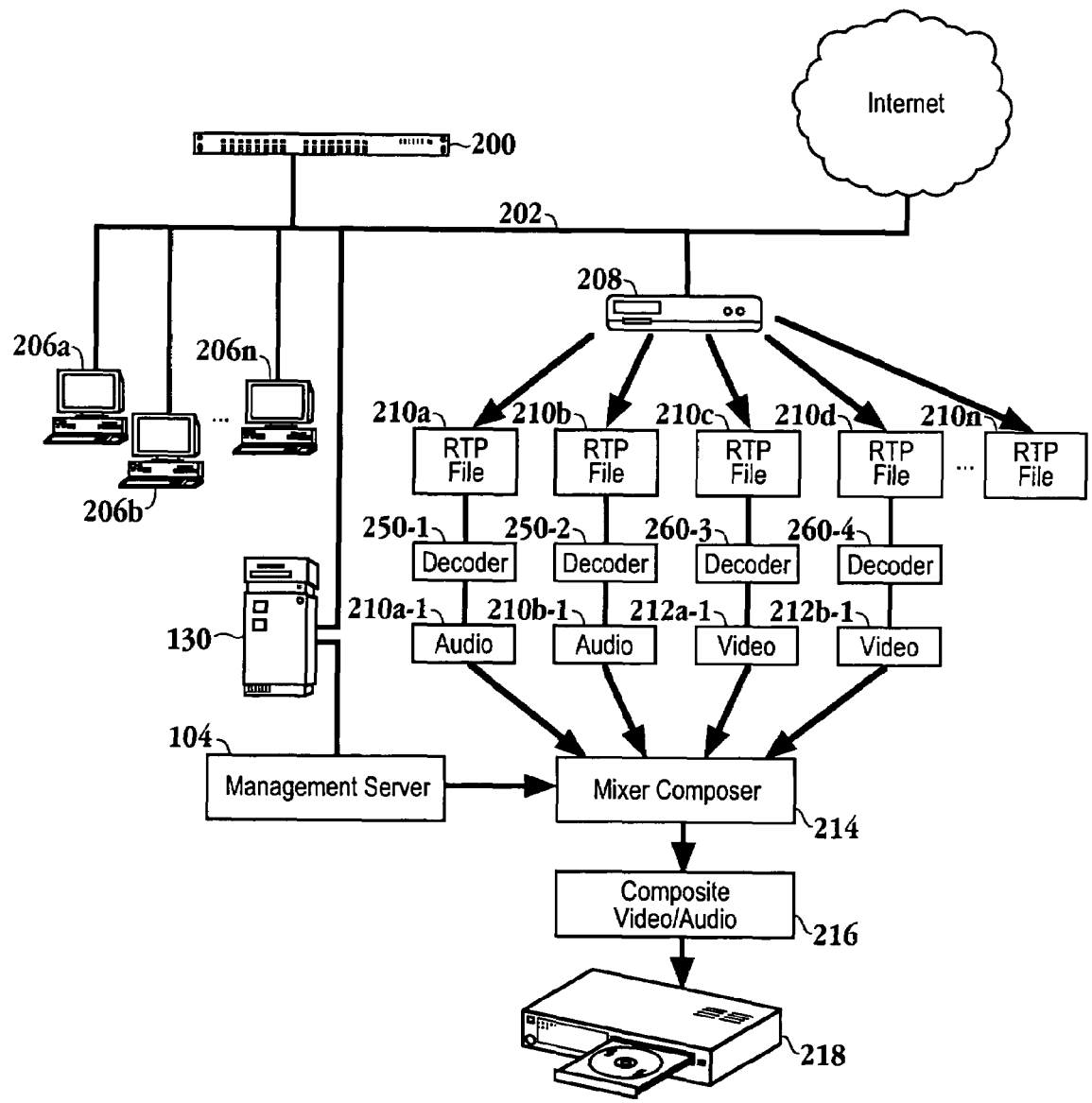
FIG. 3 is a simplified schematic diagram illustrating an overview of the system architecture where a network sniffer is used for filtering and then sorting packets into video and audio streams in accordance with one embodiment of the invention.

FIG. 3 is a simplified schematic diagram illustrating an overview of the system architecture where a network sniffer is used for filtering and then sorting packets into video and audio streams in accordance with one embodiment of the invention. Server 130 is in communication with a plurality of video conference clients 206*a* through 206*n* through Ethernet bus 202. Ethernet hub 200 is in communication with Server 130 over Ethernet bus 202. One skilled in the art will appreciate that clients 206*a*-206*n* may be in communication with a gateway that acts as an entrance to Ethernet bus 202 and for illustrative purposes are shown connected to the Ethernet bus in FIG. 3. Here, clients 206*a*-206*n* are logically connected to Ethernet bus 202 through the gateway and not physically connected to the Ethernet bus. Meeting sniffer 208 has access to Ethernet bus 202. It should be appreciated that other suitable networking technologies may be used in place of the Ethernet networking technology. For example, token ring, fiber distributed data interface (FDDI), and ARCNET technologies may be used with the embodiments described herein as the network technology for the distributed network.

Meeting sniffer 208 of FIG. 3, is configured to identify packets related to a video conference session and log the packets to a corresponding hard drive. Here, meeting sniffer 208 identifies the relevant packets according to predefined criteria. The predefined criteria may include a source internet protocol (IP) address, a destination IP address, a contributing source (CSRC) identifier, a packet type, and a port number. The identified packets are then delivered to corresponding real time protocol (RTP) files 210*a* through 210*n*. The corresponding RTP files 210*a* through 210*n* to which a packet is delivered is determined through the analysis of a CSRC reference. In one embodiment, the CSRC reference is a unique identifier to the source for a payload contained in a respective RTP packet. An exemplary configuration of a RTP packet header having a CSRC field is described below.

Figure 4:
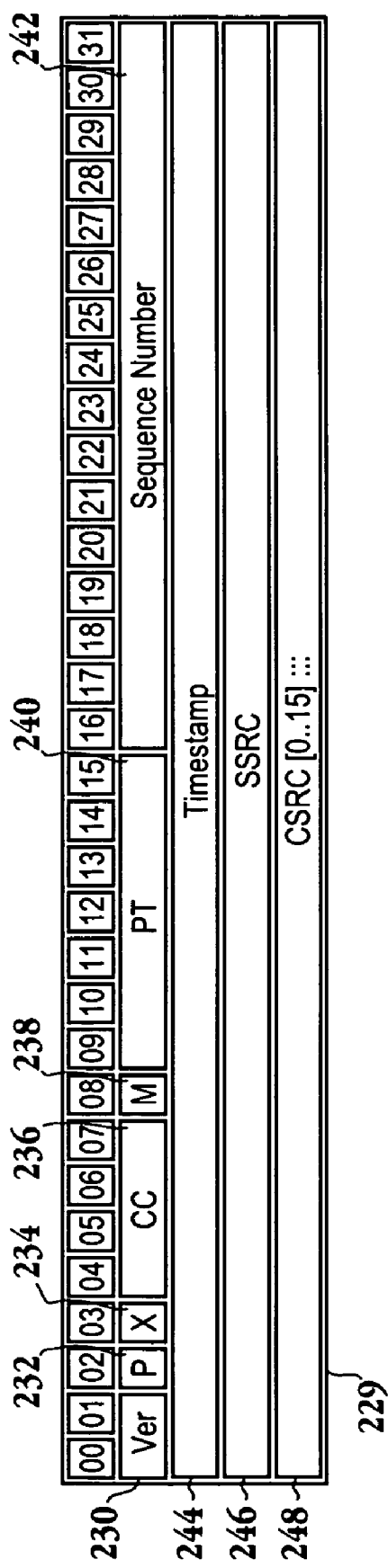
FIG. 4 is a simplified schematic diagram of the header fields of an RTP packet in accordance with one embodiment of the invention.

FIG. 4 is a simplified schematic diagram of the header fields of a RTP packet in accordance with one embodiment of the invention. As is generally known, RTP provides end-to-end network transfer functions suitable for applications transmitting real-time data, such as audio, video or simulation data over multi-cast or uni-cast network services. The data transport is augmented by a real time control protocol (RTCP) to allow monitoring of the data delivery in a manner scalable to large multi-cast networks, and to provide minimal control in identification functionality. It should be appreciated that RTP and RTCP are designed to be independent of the underlying transport and network layers. RTP header 229 provides information for a receiver on how to construct the corresponding data and describes how the codec bit streams are packetized.

Field 230 of RTP header 229 indicates the RTP version number. Field 232 is a padding field that, if set, contains one or more additional padding bytes at the end of which are not part of the payload. Field 234, if set, indicates that the header is followed by exactly one header extension. Field 236 indicates a contributing source count (CC). Here, the four-bit field contains the number of contributing source identifiers that follow the fixed header. Field 238 represents a one-bit marker that is defined by a profile. This marker is intended to allow significant events, such as frame boundaries, to be marked in the packet stream. Field 240 contains the payload type (PT), which identifies the format of the RTP payload and determines its interpretation by the application. Field 242 identifies a 16-bit sequence number which increments by one for each RTP data packet sent. It should be appreciated that field 242 may be used by the receiver, e.g., the sniffer described herein, to detect data packet loss and to restore packet sequence. Field 244 represents a 32-bit time stamp that reflects the sampling instant of the first octet in the RTP data packet. In one embodiment, the sampling instant is derived from a clock at increments monotonically and linearly in time to allow synchronization and jitter calculations. As mentioned previously, the time stamp of the packet header may be used to correlate events into a recorded videoconference session and to create an index for the recorded video conference session.

Field 246 of FIG. 4 identifies the synchronization source (SSRC). This identifier may be chosen randomly with the intent that no two synchronizations sources within the same RTP session will have the same SSRC identifier. Field 248 identifies the contributing source (CSRC) for the payload contained in the RTP packet. As mentioned above, the number of identifiers in CSRC field 248 is provided by field 236. The CSRC identifiers are inserted by mixers, using the SSRC identifiers of the contributing sources. For example, for audio packets, the SSRC identifiers of all sources that were mixed together to create a packet are listed, allowing correct talker indication at the receiver.

Returning to FIG. 3, each video conference session may include four streams. These four streams represent two audio streams (audio up and audio down), and two video streams (video up and video down). In one embodiment, where the participants communicate through a server, such as a MCU, and each participant runs a videoconference session, then each session is associated with two video streams and two audio streams. The data within each of RTP files 210a through 210n is decoded through a corresponding decoder 250-1, 250-2, 260-1, and 260-2, as described in more detail with reference to FIGS. 5 and 6. The corresponding audio streams 210a-1 and 210b-1 and video streams 212a-1 and 212b-1 are then merged into one stream through mixer/composer 214. In one embodiment, an index is used to intelligently merge the audio and video streams into one single stream. This index may be provided through management server 104, which includes a time stamp associated with each of the segments of the audio and video streams. In another embodiment, this time stamp may correspond to the time stamp associated with an event stored in event data base 114. Here, an annotation event or any other suitable event, such as a participant leaving or entering the conference session, may be used to generate an index for play back control (PBC) purposes, as described below with reference to FIG. 7. The composite video/audio stream 216 is then delivered to a compact disc/digital versatile disc writer 218. Here, composite video/audio data 216 is captured on a storage medium, e.g., a compact disc (CD) or digital versatile disc (DVD).

Meeting sniffer 208 has access to Ethernet bus 202, as does server 130. Because Ethernet hub 200 broadcasts all the network packets, all the Ethernet adapters connected to this bus will receive the packets on the bus, as long as the adapter driver is set to promiscuous mode. It will be apparent to one skilled in the art that server 130 may communicate with Ethernet bus 202 through a network interface card (NIC) of the server. In one embodiment, characteristics that are used to sniff all the packets for a video conference session matches the following criteria:

1. The destination host of the packet is server 130.
 2. The packet is a RTP packet.

It should be appreciated that packets having this criteria may be found by examining the packet header. Thus, the above criteria is used to filter the packet data on the network, so that data associated with the videoconference session is kept, while other data is discarded. Once a packet that matches the above criteria is received, the following pseudo code is executed:

```
Retrieve the CSRC field that identifies the RTP connection.
if   (the retrieved CSRC exists in the hash table created) {
     Validate the RTP packet identifies a good connection.
     If (valid) {
          Save the packet to the RTP file dump.
     }
} else {
     Create a new RTP file.
     Create a new entry in the hash table maps CSRC to RTP file.
     Save the packet to the RTP file dump.
}
Consume the packet
```

The above pseudo code accomplishes the function of sorting the filtered packets. In one embodiment, a hash table relating the CSRC to a RTP file name is created. One skilled in the art will appreciate that a hash function may be used to accelerate the sorting of packets to create the data stream corresponding to the CSRC value. Thus, a plurality of RTP files will be created where one RTP file is created to represent a single audio or video stream. That is, where there are four streams, there will be four RTP files. The IP pair of the server and the client host should identify the video and audio pair. For example, if both audio and video streams are active between IP1 and IP2 there should be four RTP files saved for the IP pair. It should be appreciated that the IP (Internet Protocol) pair refers to a session between machines associated with the addresses corresponding to IP1 and IP2.

After a meeting in the MCU server finishes, meeting mixer composer 214 will initiate as an offline process while the meeting sniffer is a real time process. That is, when a meeting ends, an offline process initiates. Thus, there is no extra overhead incurred by server 130. Several RTP files 210a through 210n are created and saved for the videoconference meeting. In one embodiment, all of the audio RTP files 210a-1 and 210b-1 are decoded to a corresponding decoder to pulse code modulation (PCM) streams, while the video RTP files 212a-1 and 212b-1 are decoded by a corresponding decoder to YUV format frames. One skilled in the art will appreciate that the digitization of the analog audio/video signals may be accomplished through a communications circuit, where the analog signal is digitized through a quantization process or other suitable digitization process known in the art through logic of the communications circuit.

Figure 5:
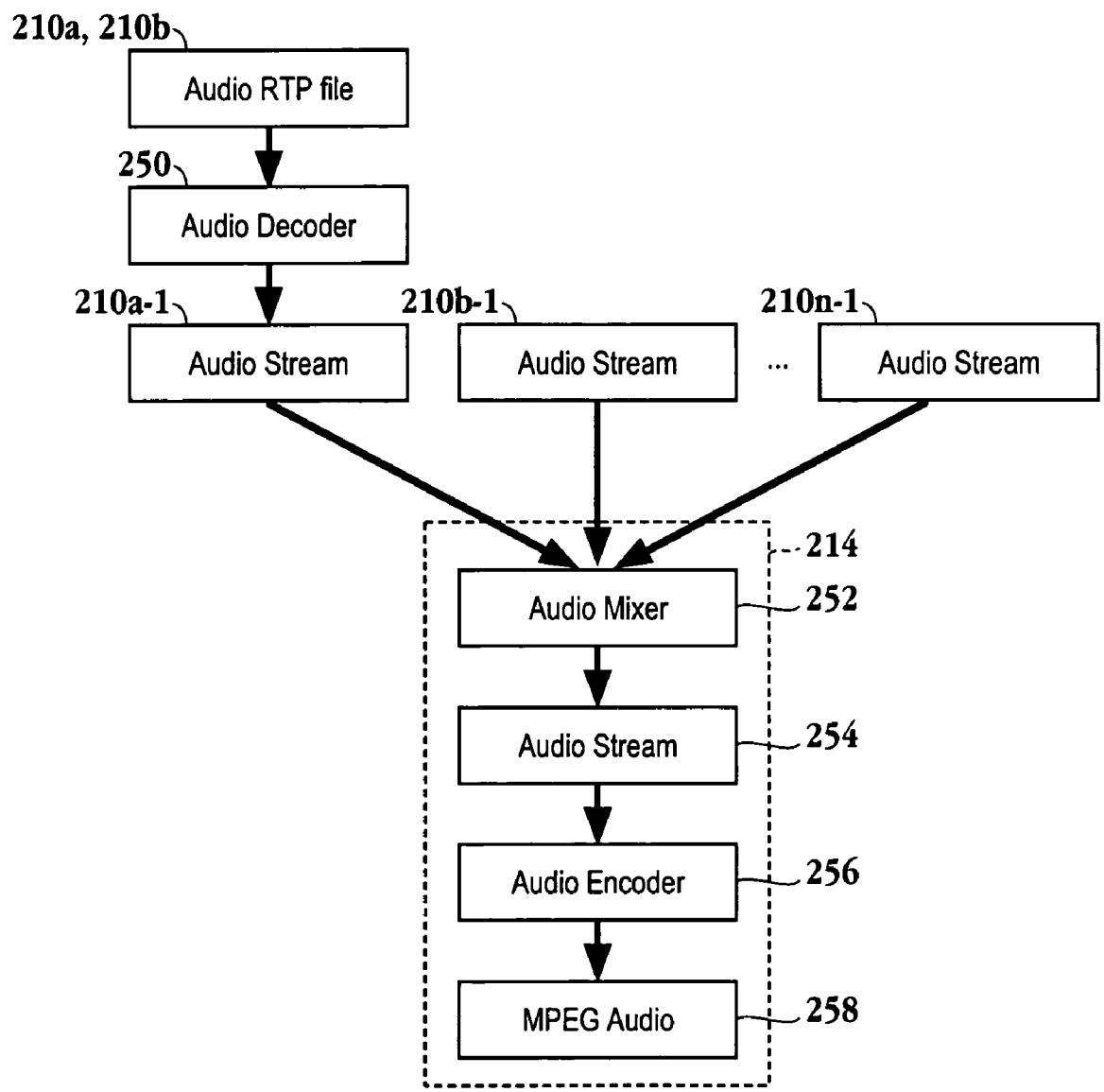
FIG. 5 is a simplified schematic diagram representing the creation of a single audio stream from the multiple audio streams of the videoconference session in accordance with one embodiment of the invention.

FIG. 5 is a simplified schematic diagram representing the creation of a single audio stream from the multiple audio streams of the videoconference session in accordance with one embodiment of the invention. Meeting mixer/composer 214 identifies all of the audio RTP files 210a and 210b. It will be apparent to one skilled in the art that the audio/video data may be identified, e.g., through the file name, a bit of the file, etc. In one embodiment, a flag may be incorporated in the pseudo code discussed above at the "Create a new RTP file" step. Of course, more than two audio RTP files may be included here.

As mentioned above, the data from audio RTP files are decoded into PCM streams through audio decoder module 250 of FIG. 5. One skilled in the art will appreciate that audio decoder module 250 may be a communications circuit configured to generate the PCM streams from the corresponding RTP files. Each of the decoded audio streams 210a-1 through 210*n*-1 are then mixed through audio mixer module 252. It should be appreciated that each of audio streams 210*a*-1 through 210*n*-1 have the same time stamp. That is, FIG. 5 represents a snapshot where each audio stream 210*a*-1 through 210*n*-1 have a common time stamp. In essence, FIG. 5, represents the capture of the audio for each participant at a particular time point of the videoconference. Thus, meeting mixer/composer 214 mixes the audio streams into single audio stream 254. Mixed audio stream 254 is then encoded through audio encoder module 256. In one embodiment, audio encoder module 256 encodes the audio as motion picture expert group (MPEG) audio file 258. It will be apparent to one skilled in the art that audio encoder 256 may encode the audio stream into any suitable format or standard and is not limited to the MPEG standard.

Figure 6:
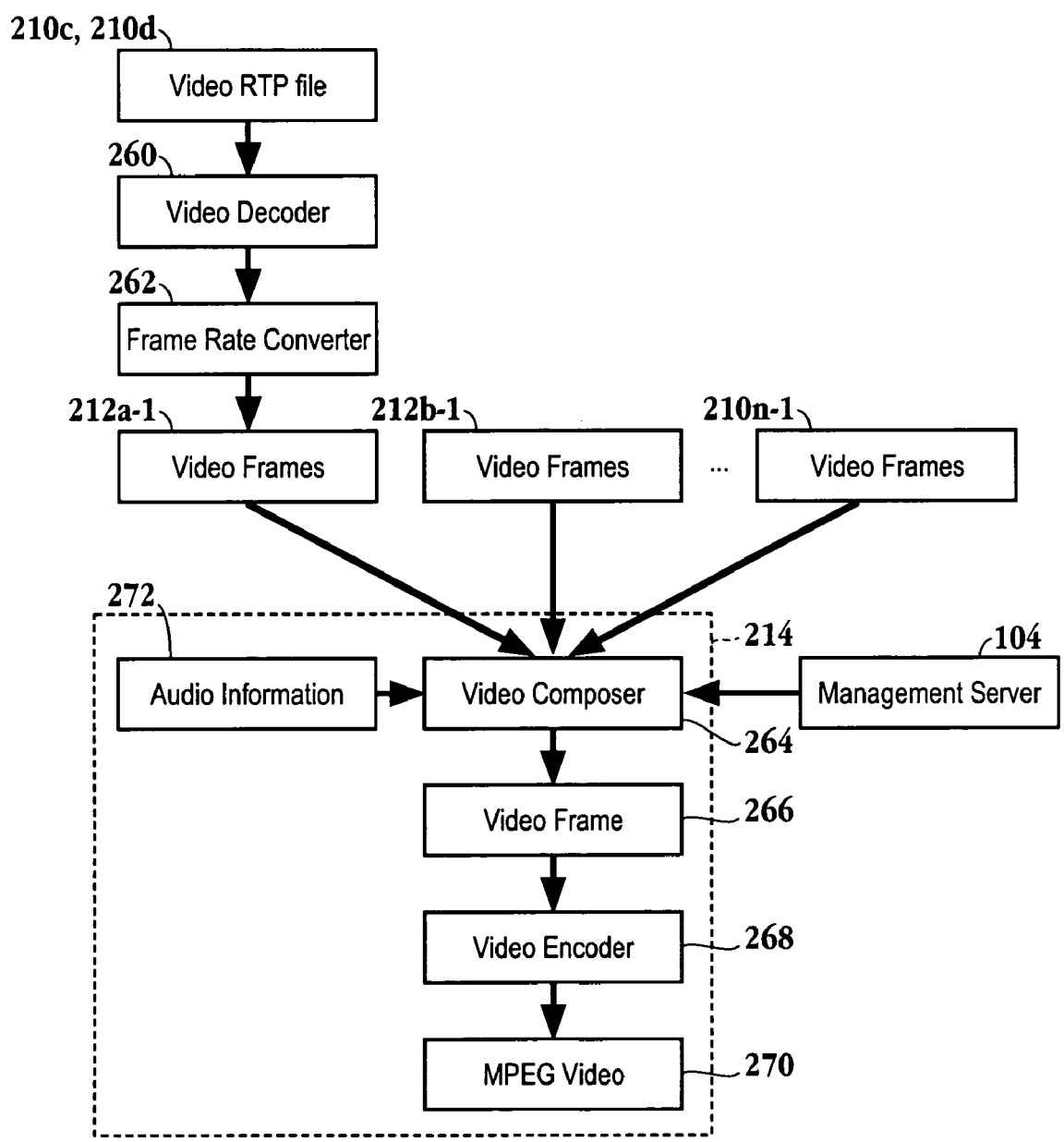
FIG. 6 is a simplified schematic diagram representing the creation of a single video stream from the multiple video streams of the videoconference session in accordance with one embodiment of the invention.

FIG. 6 is a simplified schematic diagram representing the creation of a single video stream from the multiple video streams of the videoconference session in accordance with one embodiment of the invention. For a video stream, meeting mixer composer 214 identifies all of the video RTP files, such as video RTP files 210*c* and 210*d* of FIG. 3. As discussed above with the audio files, the invention is not limited to two video files being mixed. These video RTP files are decoded, through video decoder module 260 to a suitable color format for each frame of the video RTP files, such as the YUV color format, RGB color format, etc. It should be noted that video decoder 260 may decompress the video data when decoding the video data. Frame rate converter module 262 converts the decoded video data to a suitable frame rate. For example, the decoded video data may be associated with a frame rate that is too low for recording to a DVD standard, which typically requires a frame rate of approximately 30 frames per second. Thus where the frame rate for the video RTP files is less than 30, e.g., 9 frames per second, additional frames can be added to increase the frame rate. In one embodiment, the additional frames may be copies of a previous or subsequent frame in the series of frames. In another embodiment, the additional frames may be an average of two successive frames and the additional frame is inserted between the successive frames, thereby increasing the frame rate.

Still referring to FIG. 6, frame rate converter module 262 provides video frames 212*a*-1 through 212*n*-1 for mixing. Here, similar to the audio frames of FIG. 5, each video frame 212*a*-1 through 212*n*-1 have the same time stamp, as FIG. 6 also represents a snapshot of the mixing process. The time stamp of the video may be matched with the timestamp of the corresponding audio from FIG. 5, through audio information module 272 of FIG. 6. It should be appreciated that the audio information of audio information module 272 is developed from audio streams 210*a*-1 through 210*n*-1 of FIG. 5. Additionally, management server 104 may provide information for intelligently composing video frames 212*a*-1 through 212*n*-1. For example, with reference to FIG. 2, event information stored in event database 114, which is accessed through management server 104, is provided to video composer 264. Thus, events such as a participant who changed a slide in the conference session corresponding to the time point, or a participant drawing the annotation, may be the main speaker. Other events include, when a participant joins the conference, when a participant leaves the conference, and any suitable annotation.

Video composer 264 of FIG. 6 may utilize this event information to cause the participant associated with the event to be displayed as the main speaker in a user interface of the recorded videoconference session. Here, the main speaker may be represented as the largest portion of a display for the frame relative to the other participants. For example, where there are four participants on the videoconference, the an image of the main speaker occupies half of the display, while the images of the remaining 3 participants occupy equal segments of the remaining half of the display. Of course, the main speaker may be highlighted or represented in some other suitable fashion to differentiate the main speaker from the other participants. In another embodiment, the main speaker may be identified through the analysis of the audio power for each of the participants, as enabled through audio information module 272. Here, the participant with the most powerful audio signal will be represented as the main speaker. Video composer 264 outputs video frame 266 according to the intelligent composition scheme described above. Composed video frame 266 is then encoded through video encoder module 268, which may be any suitable video encoder known in the art. Where video encoder module 268 is an MPEG video encoder, the resulting output from the video encoder is MPEG video file 270.

Figure 7:
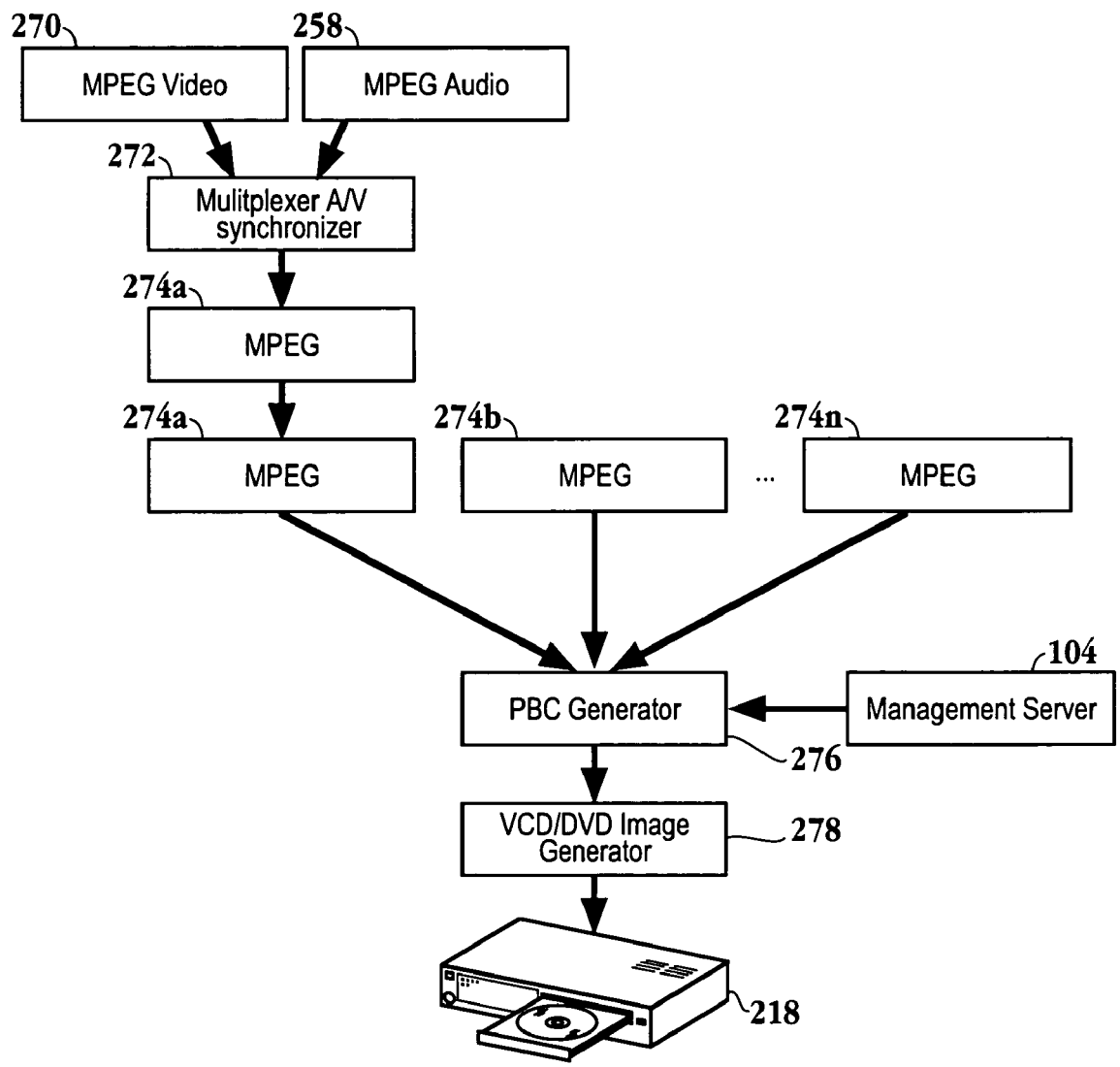
FIG. 7 is a simplified schematic diagram illustrating the mixing of the audio and video files generated by FIGS. 5 and 6, in accordance with one embodiment of the invention.

FIG. 7 is a simplified schematic diagram illustrating the mixing of the audio and video files generated by FIGS. 5 and 6, in accordance with one embodiment of the invention. MPEG video file 270 and MPEG audio file 258 are mixed through multiplexer audio/video synchronizer 272. Here, multiplexer audio/video synchronizer 272 creates a MPEG file and synchronizes audio and video data for video compact disc (VCD) or a DVD standard. Multiplexer audio/video synchronizer 272 outputs MPEG files 274*a* through 274*n* for each pair of video and audio inputs. MPEG files 274*a* through 274*n* are combined through playback control (PBC) generator 276. PBC generator 276 is also in communication with management server 104. Thus, PBC generator 276 may incorporate annotation data or event data access through management server 104 into the combined MPEG data stream. Exemplary annotation data or events include slide transitions, participant conversation, or participant activities recorded in meeting management server or meeting analysis server described with reference to FIG. 2. For example, indexing may be utilized to go to a power point slide through a time stamp in the event recorder, which in turn, is referenced to a time stamp of the video stream. The resulting data stream is captured onto a corresponding VCD or DVD storage media through image generator module 278. Thus, recording device 218 may subsequently be used to play the created VCD or DVD.

Figure 8:
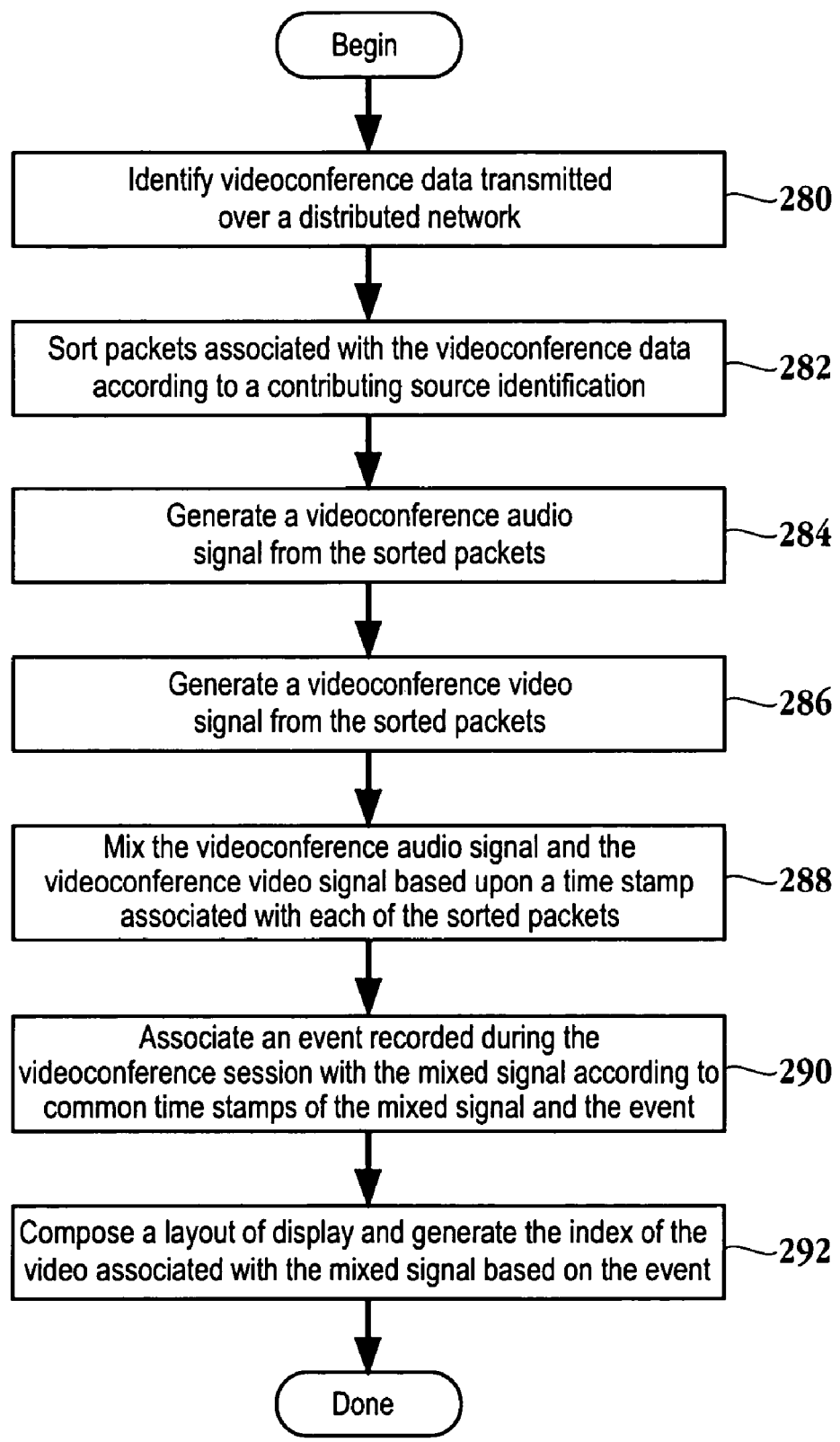
FIG. 8 is a flow chart diagram illustrating the method operations for efficiently recording video conference data of a video conference session in accordance with one embodiment of the invention.

FIG. 8 is a flow chart diagram illustrating the method operations for efficiently recording video conference data of a video conference session in accordance with one embodiment of the invention. The method initiates with operation 280 where video conference data transmitted over a distributed network is identified. For example, the video conference data may be identified by examining a packet header in order to determine if the packet is associated with the video conference session, i.e., filter the packets, as described above. The method then advances to operation 282 where packets associated with the video conference data are sorted according to a contributing source identification. Here, the packet header will contain the contributing source identification where each contributing source identification is unique for each video and audio stream of a conference session. It should be appreciated that the invention is not limited to sorting the data through the contributing source identification. That is, any suitable field of the packet header having data capable of distinguishing among the multiple filtered packets may be utilized. The method then moves to operation 284 where a video conference audio signal is generated from the sorted packets identified as audio data. As described with reference to FIGS. 5 and 6 a single audio stream is created for each RTP file. Similarly, in operation 286, a video conference video signal is generated from the sorted packets identified as video data as discussed with reference to FIG. 6. The method then proceeds to operation 288 where the video conference audio signal and the video conference video signal are mixed based upon a time stamp associated with each of the sorted packets. The method then advances to operation 290 where an event recorded during the video conference session is associated with the mixed signal from operation 288 according to common time stamps of the mixed signal and the event. The method then moves to operation 292 where a layout of a display is composed and an index associated with the mixed signal is generated based on the event. Here a lead participant may be distinguished from other participants as described above. In on embodiment, the index is a time stamp.

In summary, embodiments of the present invention enable the intelligent recording of a videoconference session. The use of a packet intercepting unit that discriminates between videoconference session data and non-videoconference session data and subsequently sorts the videoconference session data, avoids adding overhead to the host server. Thus, the videoconference session may be viewed from the computer readable media that the session is stored on. The integration of the meeting management server and the media analysis server enables the generation of composite audio/video streams. It should be noted that the composite stream defined through the recording system has a higher resolution then the streams sent to the participants during the videoconference session. For example, where a video frame is composed of video data for four participants and each video from the participants has a resolution of 320×240, a resolution of 640×480 may be obtained on the combined frame of the four participants.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for recording videoconference data without impacting performance of a host videoconference server, comprising:
   a) intercepting a packet associated with the host videoconference server;
   b) analyzing the packet;
   c) determining if the packet is related to a videoconference session associated with the host videoconference server by accessing a contributing source (CSRC) field of the packet, interpreting data within the CSRC field associated with a destination host, and matching the interpreted data to data identifying the host videoconference server;
   if the packet is related to the video conference session, then the method includes,
   d) determining a videoconference stream corresponding to the packet;
   e) storing the packet in a videoconference audio stream file associated with the videoconference stream when the packet is an audio packet and storing the packet in a videoconference video stream file associated with the videoconference stream when the packet is a video packet, wherein packets in a videoconference audio or video stream file have a same contributing source;
   f) repeating a)-e) for additional packets of the videoconference session;
   (g) generating a single videoconference stream from packets in the files associated with the videoconference stream for all contributing sources to the videoconference stream; and
   (h) recording the single videoconference stream onto a single videoconference file in a storage medium.

2. The method of claim 1, wherein the method operation of intercepting a packet associated with the host videoconference server includes,
   monitoring a distributed network over which the packet is transmitted.

3. The method of claim 1, wherein the method operation of analyzing the packet includes,
   accessing header information of the packet.

4. The method on claim 1, wherein the packet is intercepted by a network sniffer, wherein the method operation of determining if the packet is related to a videoconference session associated with the host videoconference server includes,
   determining by the network sniffer if the destination host of the packet is the host videoconference server; and
   determining if the packet is a real time protocol packet.

5. The method of claim 1, wherein the CSRC field of the packet is in header of the packet.

6. The method of claim 1, further comprising:
   determining a main participant for a time point within the videoconference session; and
   assigning an image corresponding to the main participant to a largest segment of a videoconference display image for the time point before recording the single videoconference stream.

7. The method of claim 1, wherein the method operation of generating a single videoconference stream from packets in each file associated with the videoconference stream includes,
   establishing an index for the generated stream;
   identifying a videoconference event;
   correlating the videoconference event with the index through corresponding timestamps.

8. A method for efficiently recording videoconference data of a videoconference session, comprising:
- identifying videoconference data transmitted over a distributed network, the videoconference data associated with a videoconference;
- sorting packets associated with the videoconference data during the videoconference according to a contributing source identification and according to whether each packet is associated with audio or video data;
- storing the sorted packets that include audio data in a audio stream file and storing the sorted packets that include video data in a video stream file, wherein the packets in the audio or video stream file have the same contributing source;
- generating a videoconference audio signal from the packets in the audio stream file;
- generating a videoconference video signal from the packets in the video stream file;
- mixing the videoconference audio signal and the videoconference video signal based upon a time stamp associated with each of the sorted packets;
- associating an event recorded during the videoconference session with the mixed signal according to common time stamps of the mixed signal and the event;
- composing a layout of a display associated with the mixed signal based on the event; and
- recording the mixed signal onto a single videoconference file in a storage medium;
- wherein the method operation of sorting packets associated with the videoconference data during the videoconference according to a contributing source identification includes retrieving a contributing source (CSRC) field from at least one of the packets, interpreting data within the CSRC field associated with a destination host, and matching the interpreted data to data identifying a host videoconference server.

9. The method of claim 8, wherein the method operation of identifying videoconference data transmitted over a distributed network includes,
- intercepting data transmitted over the distributed network;
- determining whether both a packet type and a port number associated with the data are indicative of the videoconference data; and
- storing the data when both the packet type and the port number are indicative of the videoconference data.

10. The method of claim 8, wherein the method operation of sorting packets associated with the videoconference data according to a contributing source identification includes,
- identifying a data stream of the videoconference session corresponding to the at least one of the packets based on the data from its CSRC field; and
- storing the packet in a file dedicated to the data stream.

11. The method of claim 8, wherein the time stamp associated with each of the sorted packets is provided by an originating source for each assorted packet.

12. The method of claim 8, wherein the event is selected from the group consisting of a participant leaving the videoconference session, a participant entering the videoconference session, a presented slide, and an annotation of a shared document.

13. The method of claim 8, wherein the method operation of associating an event recorded during the videoconference session with the mixed signal according to common time stamps of the mixed signal and the event includes,
- accessing an event database storing data associated with the event;
- determining a time stamp of the event;
- determining a corresponding time stamp associated with data of the mixed signal; and
- generating a menu enabling access to the event through the mixed signal.

14. The method of claim 8, wherein the method operation of composing a layout of a display associated with the mixed signal based on the event includes,
- generating an index associated with the event.

15. A computer readable medium having program instructions executed by one or more processors for recording videoconference data of a videoconference session, comprising:
- program instructions for identifying videoconference data transmitted over a distributed network, the videoconference data associated with a videoconference;
- program instructions for sorting packets associated with the videoconference data during the videoconference according to a contributing source identification and according to whether each packet is associated with audio or video data;
- program instructions for storing the sorted packets that include audio data in a audio stream file and storing the sorted packets that include video data in a video stream file, wherein the packets in the audio or video stream file have the same contributing source;
- program instructions for generating a videoconference audio signal from the packets in the audio stream file;
- program instructions for generating a videoconference video signal from the packets in the video stream file;
- program instructions for mixing the videoconference audio signal and the videoconference video signal based upon a time stamp associated with each of the sorted packets;
- program instructions for associating an event recorded during the videoconference session with the mixed signal according to common time stamps of the mixed signal and the event;
- program instructions for composing a layout of a display associated with the mixed signal based on the event; and
- program instructions for recording the mixed signal onto a single videoconference file in a storage medium;
- wherein the program instructions for sorting packets associated with the videoconference data during the videoconference according to a contributing source identification includes program instructions for retrieving a contributing source (CSRC) field from at least one of the packets, interpreting data within the CSRC field associated with a destination host, and matching the interpreted data to data identifying a host videoconference server.

16. The computer readable medium of claim 15, wherein the program instructions for identifying videoconference data transmitted over a distributed network includes,
- program instructions for intercepting data transmitted over the distributed network;
- program instructions for determining whether both a packet type and a port number associated with the data are indicative of the videoconference data; and
- program instructions for storing the data when both the packet type and the port number are indicative of the videoconference data.

17. The computer readable medium of claim 15, wherein the program instructions for sorting packets associated with the videoconference data according to a contributing source identification includes,
- program instructions for identifying a data stream of the videoconference session corresponding to the at least one of the packets based on the data from its CSRC field; and program instructions for storing the packet in a file dedicated to the data stream.

18. The computer readable medium of claim 15, wherein the time stamp associated with each of the sorted packets is provided by an originating source for each assorted packet.

19. The computer readable medium of claim 15, wherein the event is selected from the group consisting of a participant leaving the videoconference session, a participant entering the videoconference session, a presented slide, and an annotation of a shared document.

20. The computer readable medium of claim 15, wherein the program instructions for associating an event recorded during the videoconference session with the mixed signal according to common time stamps of the mixed signal and the event includes,
  program instructions for accessing an event database storing data associated with the event;
  program instructions for determining a time stamp of the event;
  program instructions for determining a corresponding time stamp associated with data of the mixed signal; and
  program instructions for generating a menu enabling access to the event through the mixed signal.

21. A video conference system, comprising:
  a plurality of clients;
  a host server configured to distribute media to the plurality of clients over a distributed network, the host server further configured to receive media from the plurality of clients;
  a packet intercepting unit having access to the distributed network, the packet intercepting unit configured to identify packets related to a video conference session hosted by the host server, the packet intercepting unit further configured to sort the identified packets during the video conference session according to a contributing source and according to whether each packet is associated with audio or video data;
  a media management system in communication with the host server, the media management system configured to manage both media data and annotation data, the media management system further configured to capture events associated with the annotation data; and
  logic for analyzing data within a contributing source (CSRC) field of the identified packets in order to sort the identified packets according to the contributing source, the analyzing including interpreting data within the CSRC field associated with a destination host, and matching the interpreted data to data identifying the host server.

22. The video conference system of claim 21, wherein the media management system further includes,
  a media management server configured to manage both the media data and the annotation data for distribution to participants of the videoconference session;
  a storage server in communication with the media management server, the storage server configured to store both the media data and the annotation data;
  an event database in communication with the media management server, the event database configured to capture events associated with the annotation data; and
  a media analysis server in communication with the media management server, the event database, and the storage server, the media analysis server configured to associate the stored annotation data with the captured events.

23. The video conference system of claim 21, wherein the packet intercepting unit further includes,
  logic for filtering packets on the distributed network according to a packet type and a port number associated with the packets on the distributed network in order to identify packets related to the videoconference session.

24. The videoconference system of claim 23, wherein the logic elements are one or a combination of software and hardware.

25. The video conference system of claim 21, further comprising:
  a mixer/composer in communication with the packet intercepting unit, the mixer/composer configured to decode corresponding sorted packets, the mixer/composer further configured to combine decoded corresponding audio packets into a single audio data stream and combine decoded corresponding video packets into a single video stream;
  a synchronizer configured to synchronize and combine the single audio stream and the single video stream into a data stream; and
  a playback generator in communication with the media management system and the synchronizer, the playback generator configured to generate an index of events for the data stream, the index of events relating annotation data time stamps with data stream time stamps.

26. A recording system, including a host server, for capturing videoconference session data, comprising:
  a packet intercepting unit configured to identify packets related to the videoconference data being transmitted over a network, the packet intercepting unit further configured to sort the related packets into corresponding files according to a contributing source and to whether the related packet contains audio or video data, wherein the packets are sorted during a videoconference associated with the videoconference data, wherein each data stream of the videoconference session is associated with one of the corresponding files;
  a decoder configured to decode data in each of the corresponding files to respective data streams;
  a mixer/composer configured to combine the respective data streams into a single data stream;
  a recording device configured to record the single data stream onto a storage medium; and
  logic for analyzing data within a contributing source (CSRC) field of the identified packets in order to sort the identified packets according to the contributing source, the analyzing including interpreting data within the CSRC field associated with a destination host, and matching the interpreted data to data identifying the host server.

27. The system of claim 26, wherein the packet intercepting unit is a sniffer.

28. The system of claim 26, wherein the packet intercepting unit further includes,
  logic for filtering packets on the distributed network according to a packet type and a port number associated with the packets on the distributed network in order to identify packets related to the videoconference session.

29. The system of claim 26, further comprising:
  a frame rate converter in communication with the decoder, the frame rate converter configured to adjust a first frame rate associated with decoded video data to a second frame rate suitable for the recording device.

30. The system of claim 26, further comprising:
  a playback generator in communication with the mixer/composer, the playback generator further configured to generate an index of events for the single data stream, the index of events relating annotation data time stamps with the single data stream time stamps.

31. The system of claim 26, wherein the storage medium is one of a video compact disc (VCD) and a digital versatile disc (DVD).

32. The system of claim 28, wherein each logic element is one of or a combination of hardware and software.

* * * * *